Sept. 29, 1931.   J. C. HEWITT   1,825,648
INSECTICIDE APPLYING APPARATUS
Filed April 19, 1930   2 Sheets-Sheet 1
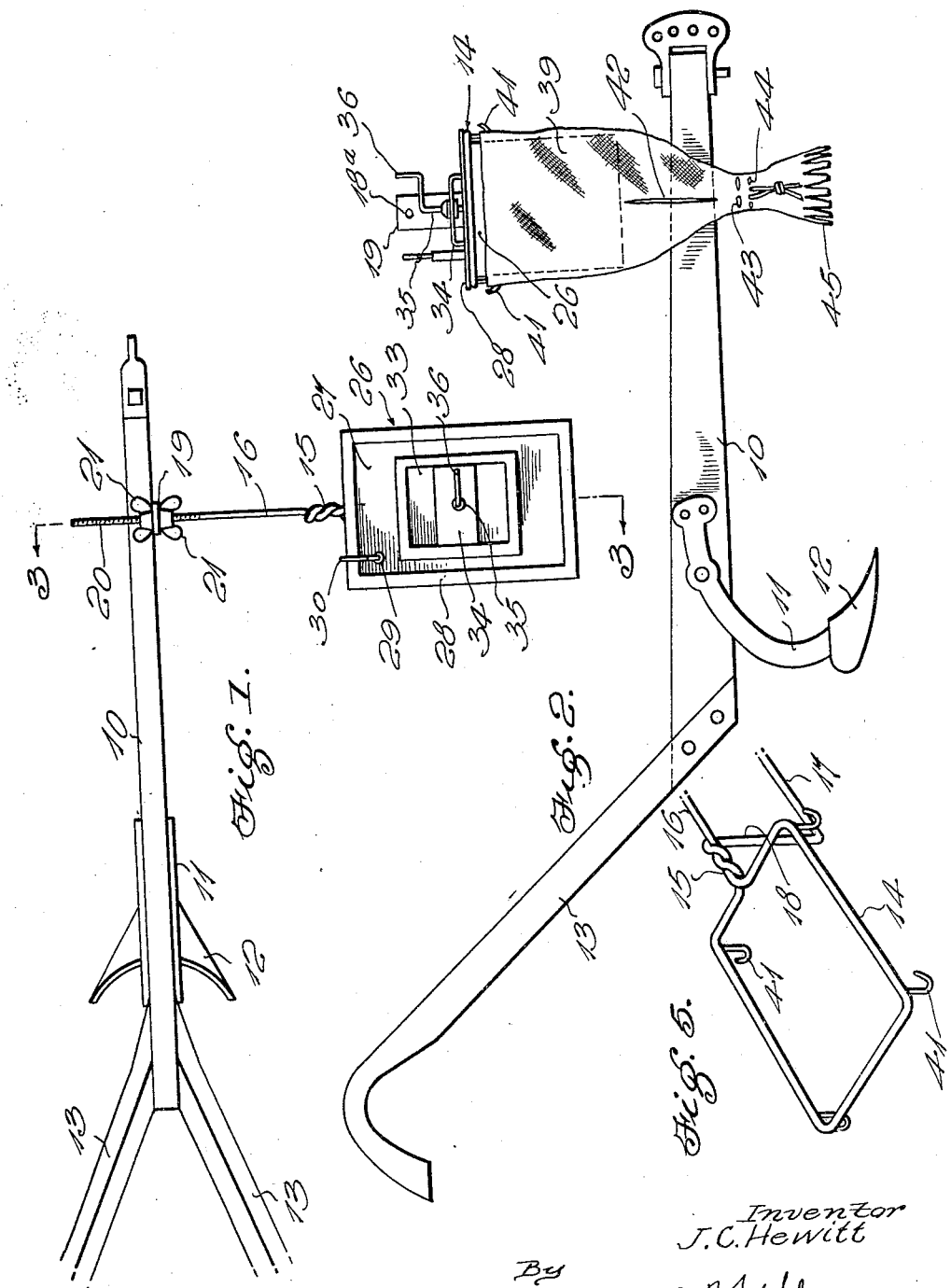
Inventor
J. C. Hewitt
By
B. P. J. Welburne
Attorney Sept. 29, 1931.  J. C. HEWITT  1,825,648
INSECTICIDE APPLYING APPARATUS
Filed April 19, 1930   2 Sheets-Sheet 2
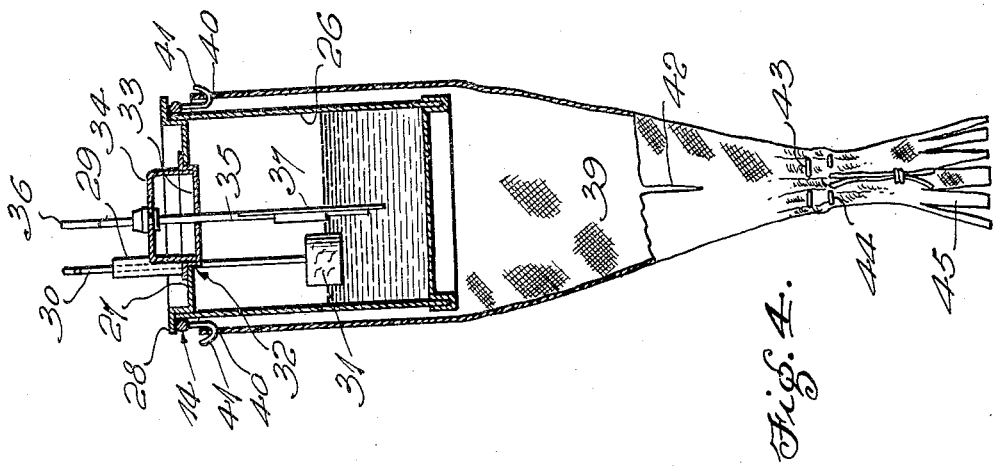
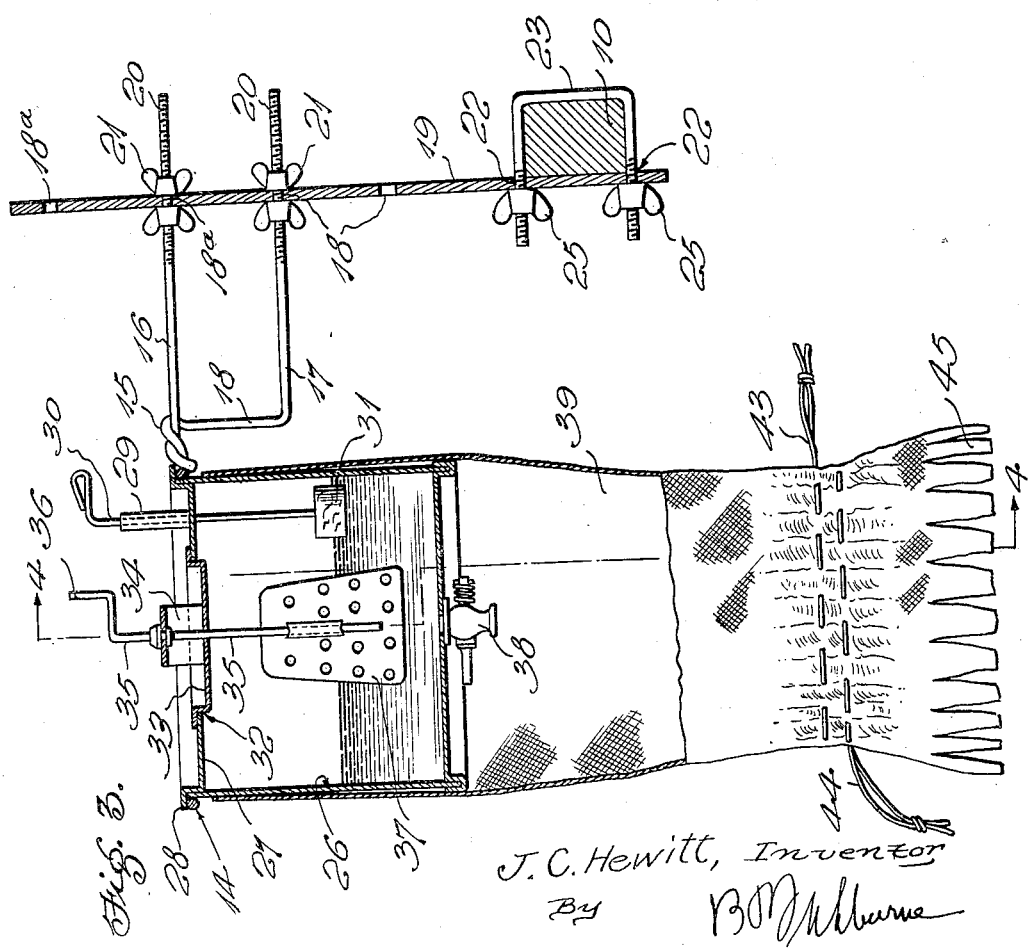
J. C. Hewitt, Inventor Patented Sept. 29, 1931

1,825,648

UNITED STATES PATENT OFFICE

JOHN C. HEWITT, OF TIMMONSVILLE, SOUTH CAROLINA, ASSIGNOR OF ONE-HALF TO LACY A. CASHWELL, OF STAMFORD, CONNECTICUT

INSECTICIDE APPLYING APPARATUS

Application filed April 19, 1930. Serial No. 445,737.

My invention relates to a machine for applying a liquid poison to growing plants, such as the cotton plant, to destroy the boll weevil.

An important object of the invention is to provide apparatus of the above mentioned character, which may be attached to a plow, so that the poison may be applied during the cultivation of the cotton.

A further object of the invention is to provide apparatus of the above mentioned character which is adjustable for applying a liquid poison to plants of different sizes.

A further object of the invention is to provide a mop element which is transversely adjustable for use in connection with plants of different sizes.

A further object of the invention is to provide means whereby the mop element is removably bodily mounted upon the liquid poison holding receptacle, to prevent loss of the liquid poison and to provide means whereby the mop element may be readily removed, when desired.

A further object of the invention is to provide a device of the above mentioned character which is simple in construction, strong, durable, and reliable in operation.

Other objects and advantages of the invention will be apparent during the course of the following description.

In the accompanying drawings, forming a part of this specification, and in which like numerals are employed to designate like parts throughout the same, Figure 1 is a plan view of apparatus embodying my invention, Figure 2 is a side elevation of the same, Figure 3 is a side elevation of the mop element, parts being shown in central vertical section, taken on line 3—3 of Figure 1, Figure 4 is a vertical section taken on line 4—4 of Figure 3, and, Figure 5 is a perspective view of the supporting frame.

In the drawings, wherein for the purpose of illustration, is shown a preferred embodiment of my invention, the numeral 10 designates the beam of a cultivator, having a stock 11 carrying the plowshare 12. Handles 13 are secured to the rear end of the beam.

The liquid poison applying apparatus is in the nature of an attachment, and embodies a rectangular frame 14, preferably formed of a metal rod bent upon itself to form the frame and twisted upon itself for producing a connecting shank 15. The rod is extended beyond the shank to provide spaced upper and lower cylindrical arms 16 and 17, the arm 17 being connected with the shank by a vertical portion 18, as shown. The frame 14 is generally horizontal in use and disposed upon one side of the beam 10, with its longitudinal axis arranged at substantially a right angle to the longitudinal axis of the beam. The superposed spaced arms 16 and 17 are adapted for insertion within vertically spaced apertures 18, formed in a vertical upright or bar 19. The arms 16 and 17 are cylindrical and have screw-threaded portions 20, receiving thereon pairs of opposed wing-nuts 21, arranged upon opposite sides of the vertical bar 19. It is obvious that the frame may be vertically adjusted with respect to the bar 19 by inserting the arms 16 and 17 through selected openings 18, and also longitudinally adjusted within the selected openings 18, and subsequently clamp in the adjusted position by manipulation of the wing-nuts 21. The arms 16 and 17 may also be readily separated from the vertical bar 19.

The bar 19 is provided near its lower end with a pair of transverse openings 22, receiving a U-shaped clamp 23, surrounding the beam 24, and held to the bar 19 by adjustable wing-nuts 25.

The numeral 26 designates a liquid poison holding receptacle or tank, which is rectangular and corresponds in shape to the rectangular supporting frame 19 and is of a size to fit snugly therein. The tank 26 is covered by a top 27, soldered or otherwise rigidly secured thereto, and this top provides a marginal horizontal flange 28, projecting laterally beyond the tank 26 and adapted to rest upon the frame 14, thereby supporting the tank within the frame. The arrangement is such that the tank may be readily removed from the frame, when desired. The top 27 is provided with a tubular guide 29, which is vertically disposed, and receives a liquid level indicator 30, actuated by a float 31. The top 27 is provided centrally thereof with an opening 32, through which the liquid insecticide may be introduced into the tank, and this opening is closed by a removable lid cover 33, provided upon its top with an inverted U-shaped bracket 34. The bracket 34 carries a vertical rotatable shaft 35, which extends through an opening in the cover and enters the tank. At its upper end, the shaft 35 has a handle or crank 36 to rotate the same. At its lower end, the shaft 35 is equipped with an agitator 37. The tank 26 is provided at its bottom with a valve 38, to regulate the supply of the liquid poison from the tank and this valve is preferably disposed centrally of such bottom.

The numeral 39 designates a tubular mop element, formed of some suitably stout flexible absorbent fabric, such as denim. This tubular mop element is adapted to be bodily mounted about the tank 26 and receives the tank in its upper end. The mop element is provided near its top with openings or slits 40, for detachably receiving depending hooks 41, rigidly attached to the frame 14, near its corners. The mop element has a hand receiving slit or pocket 42, arranged near and beneath the tank 26, adjacent to one corner of the tank, so that the hand may be inserted within the tubular mop element to manipulate the valve 38. The tubular mop element 39 projects downwardly below the tank 36 for a substantial distance and assumes the form of a generally flat wiper, its sides contacting at the adjustable draw-strings 43 and 44. I employ two of these draw-strings arranged in superposed relation and they are separate from each other and their free ends extend in opposite directions. By pulling these ends outwardly away from each other, the width of the wiping end of the mop element may be adjusted, depending upon the size of the plant, the mop element being somewhat gathered at the draw-strings. The draw-strings are spaced from the free lower end of the mop element, and this free lower end is preferably slit for affording strips 45.

In operation, the plow or cultivator is drawn between the rows of cotton, to cultivate the same, and the tank 26 will travel over the tops of the cotton plants at such an elevation that the tank or valve 38 will not contact therewith. The lower portion of the tubular mop element will travel in contact with the plants, producing a wiping action and applying the liquid poison to the same. Due to the flexibility of the wiping element, it will not break the plants, but will properly shift or bend the branches so that the poison may be applied to the lower sides of the leaves. The liquid poison is maintained suitably agitated or stirred by rotating the shaft 35 and the level of the liquid poison is shown by the indicator 30.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:—

1. In apparatus for applying a liquid insecticide to cotton plants or the like, a frame, a liquid insecticide to cotton plants or the like, a frame, a liquid poison holding tank mounted within the frame, a flexible tubular mop receiving the tank in its upper end to telescope therewith, means for attaching the mop to the frame and outlet means for the tank, said outlet means being arranged within the tubular mop.

2. In apparatus for applying a liquid insecticide to cotton plants or the like, a frame, a liquid poison holding tank mounted within the frame, a flexible tubular mop receiving the tank in its upper end to telescope therewith, and outlet means for the tank arranged within the upper end of the tubular mop.

3. In apparatus for applying a liquid insecticide to cotton plants or the like, a frame, a liquid poison holding tank mounted within the frame and depending below the same, a flexible tubular mop receiving the tank in its upper end to telescope therewith, outlet means for the tank arranged within the tubular mop, and means to gather the lower portion of the tubular mop.

4. In apparatus for applying a liquid insecticide to cotton plants or the like, a support, a liquid poison holding tank carried thereby, a flexible tubular holding mop receiving the tank in its upper end to telescope therewith, outlet means for the tank arranged within the tubular mop, and adjustable draw-string means engaging the lower portion of the tubular mop to regulate its width.

5. In apparatus for applying a liquid insecticide to cotton plants or the like, a support, a liquid poison holding tank carried thereby, a flexible tubular mop receiving the tank in its upper end to telescope therewith and having its lower end slit to provide strips, outlet means for the tank which is surrounded by the mop, and adjustable draw-string means engaging the lower portion of the tubular mop and spaced from the strips and serving to gather such lower portion.

6. In apparatus for applying a liquid insecticide to cotton plants or the like, a substantially vertical bar having vertically spaced openings, means to clamp the bar to the beam of a cultivator, a frame having a pair of spaced arms for insertion through selected openings in the bar, pairs of nuts carried by the arms and engaging upon opposite sides of the bar, a liquid poison holding tank mounted within the frame, and a tubular mop carried by the frame and telescoping with the tank, and outlet means for the tank, said outlet means being surrounded by the tubular mop.

7. In apparatus for applying a liquid insecticide to cotton plants or the like, a generally horizontal supporting frame, a liquid poison holding tank mounted within the frame and depending below the same, a tubular mop telescoping with the tank throughout the major portion of the length of the tank, and carried by said frame, said tank and mop being independently removable from the frame, and outlet means carried by the bottom of the tank and arranged generally centrally thereof and completely surrounded by said tubular mop.

8. In apparatus for applying a liquid insecticide to cotton plants or the like, a generally horizontal supporting frame, a liquid poison holding tank removably mounted within the frame and provided near its upper end with a flange to engage over the frame while said tank projects downwardly below the frame, a tubular mop telescoping with the tank and covering the same and detachably connected with the frame, said mop projecting downwardly below the tank for a substantial distance and provided in its lower portion with a slit, the tank and mop being independently removable from said frame, and an outlet valve connected to the bottom of the tank and arranged generally centrally thereof and surrounded by the mop, access being had to the valve through said slit.

In testimony whereof I affix my signature.

JOHN C. HEWITT.